Jan. 29, 1963                A. R. SWENSON                3,075,595
                            WEIGHING MECHANISM
Filed June 22, 1959                                    2 Sheets-Sheet 1

INVENTOR.
A. R. Swenson
BY
Jerome B. Peterson
Attorney

Jan. 29, 1963

A. R. SWENSON 3,075,595

WEIGHING MECHANISM

Filed June 22, 1959

2 Sheets-Sheet 2

INVENTOR.
A.R. Swenson
BY
Jerome B. Peterson
Attorney

United States Patent Office 3,075,595
Patented Jan. 29, 1963

3,075,595
WEIGHING MECHANISM
Armound R. Swenson, Amarillo, Tex., assignor to Continental Carbon Company, Amarillo, Tex., a corporation of Delaware
Filed June 22, 1959, Ser. No. 822,049
11 Claims. (Cl. 177—120)

The present invention relates to an improved weighing mechanism. More particularly, it relates to an improved weighing mechanism for bag-filling machines adapted to feed a predetermined weight of material into the bag.

Inasmuch as the preferred embodiment of the present machine is limited to a bag-filling machine, the description will be limited thereto for the sake of clarity and convenience. It is to be understood, however, that I do not intend to limit the scope of my invention thereby, as my invention may be used in connection with any package-filling machine wherein a predetermined weight of material is added to a package.

Bag-filling and handling machines have been heretofore devised for automatically filling bags with a predetermined quantity of pulverulent materials. Machines of this type include a weighing means for automatically controlling the quantity of material fed to the bag and means for discharging the bag automatically from the machine after the required amount of material has been added to the bag. The weighing mechanisms of the prior art machines have not been entirely satisfactory but have been deficient in at least one of the following: simplicity, accuracy, or reliability. This has been particularly true in the case of machines which are exposed to dust.

Figure 1:
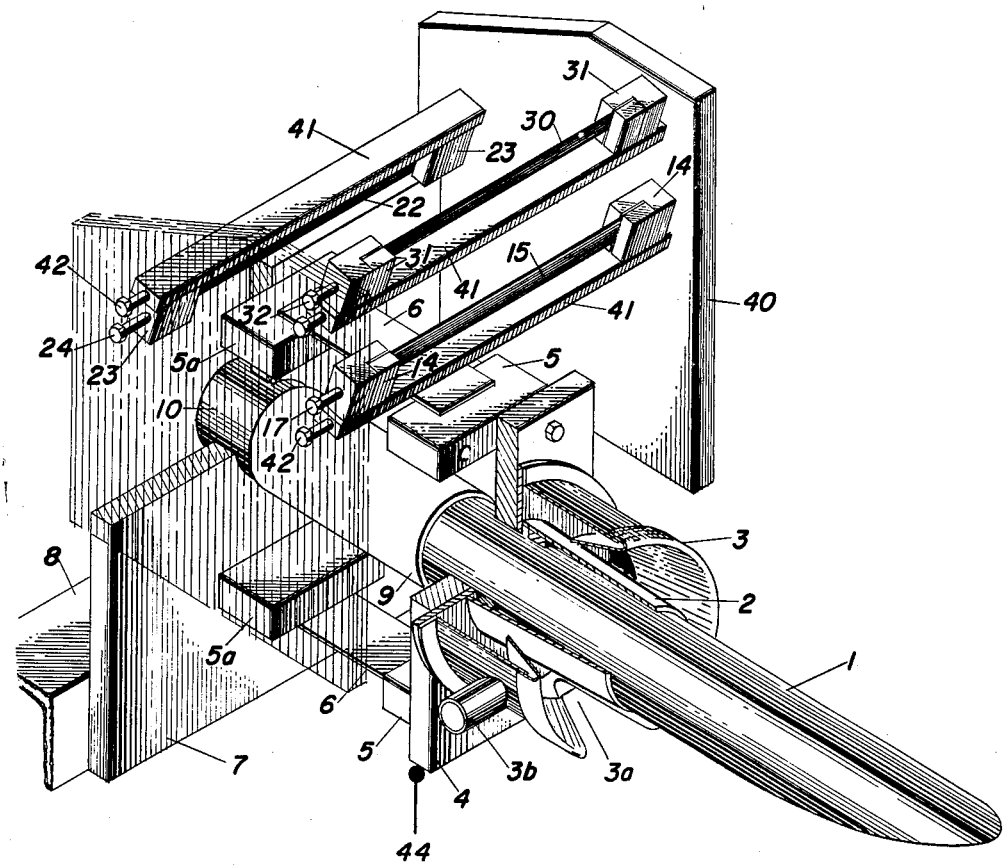
Figure 2:
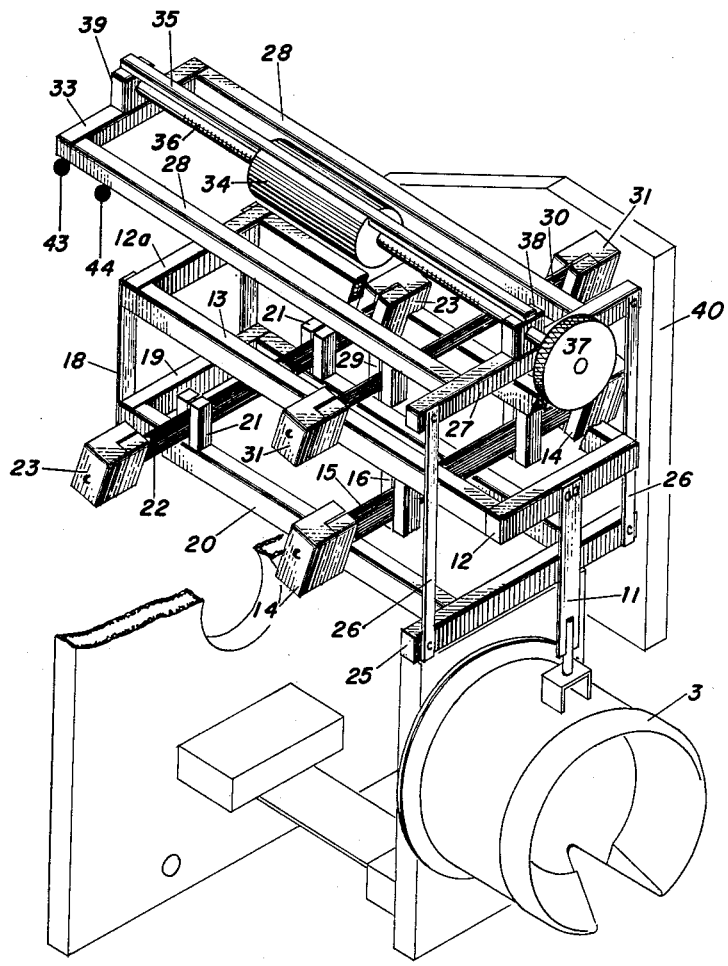

It is an object of the present invention to provide an improved weighing mechanism for bag-filling machines adapted to feed a predetermined amount of material into the bag. It is another object of the present invention to provide an improved weighing mechanism for bag-filling machines whereby placement of the bag on the spout is not critical. It is still another object of the present invention to provide an improved weighing mechanism for bag-filling machines in which the weighing mechanism is relatively unaffected by the presence of dust. Other objects and advantages will be apparent from the following description taken in connection with the accompanying drawings in which:

FIGURE 1 is a diagrammatic perspective view of the weighing mechanism, excluding most of the mechanism of the motion multiplying means; and FIGURE 2 is a diagrammatic perspective view of the motion multiplying means.

Generally, the structure achieving the above results comprises the following:

(1) A frame,
(2) A spout attached to a vertically disposed plate, said plate being attached to the frame by means of parallel flex plates;
(3) a motion multiplying means comprising a series of lever arms and torsion springs, one element of said motion multiplying means being connected to the spout and another element being attached to an actuating mechanism;
(4) an actuating mehanism for interrupting the flow of material through the spout,
(5) damping means for reducing vibration in the mechanism.

Referring now to the drawings, a preferred embodiment of the weighing mechanism is as folows:

A filling spout 1 is rigidly attached to the plate spout support 4, which in turn is attached by flex plates 6 to the back plate support 7. Front flex plate supports 5 and rear flex plate supports 5a provide attachment means for attaching the plate spout support 4 through the flex plates 6 to the back plate support 7. The back plate support 7 is attached to the main angle iron support, or frame, 8.

The filling spout 1 is surrounded by a tapered collar 2 which is rigidly attached to the plate spout support 4. A dust hood 3 surrounds the tapered collar 2 and is also rigidly attached to the plate spout support 4, there being an annular space 3a between the tapered collar 2 and the dust hood 3. A vent pipe 3b is provided on the dust hood 3 to provide means for attaching a vacuum hose for the removal of dust. A flexible hose 9 is used to connect the filling spout 1 with a pipe 10 which leads to a hopper or source of material being packaged.

A motion multiplying means is attached by means of vertical connector bar 11 to the dust hood 3. Optionally, if the dust hood is not desired, the vertical connector bar 11 may be connected to either the tapered collar 2 or the filling spout 1. This motion multiplying means is as follows: a front cross bar 12 is attached to the vertical connector bar 11. A first pair of lever arms 13 are connected between front cross bar 12 and rear cross bar 12a. Intermediate to the front cross bar 12 and rear cross bar 12a the lever arms 13 are connected to the lever arm torsion spring 15 by means of lever arm clamps 16. The ends of lever arm torsion spring 15 are securely clamped to the end plates 40 by means of lever arm end clamps 14 and lever arm end clamp bolts 17. End plates 40 are secured to back plate support 7, which in turn is secured to frame 8.

The rear cross bar 12a of the lever arms 13 is connected by means of vertical connector bars 18 to the rear cross bar 19 of a second pair of lever arms 20. Intermediate to the front cross bar 25 and the rear cross bar 19, the lever arms 20 are connected to the lever arm torsion spring 22 by means of lever arm clamps 21. The ends of the lever arm torsion spring 22 are securely clamped to the end plates 40 by means of lever arm end clamps 23 and lever arm end clamp bolts 24.

The front cross bar 25 of the lever arms 20 is connected by means of vertical connector bars 26 to the front cross bar 27 of a third pair of lever arms 28. Intermediate to the front cross bar 27 and the rear cross bar 33, the lever arms 28 are connected to the lever arm torsion spring 30 by means of the lever arm clamps 29. The ends of the lever arm torsion spring 30 are clamped to the end plates 40 by means of lever arm end clamps 31 and lever arm end clamp bolts 32.

A Micro Switch or magnet switch 43 is actuated by rear cross bar 33 of the lever arms 28. This switch is adapted to interrupt the flow of material to and through the spout when the bag attached thereto has reached the desired predetermined weight, as will be more apparent from the description hereinafter set forth. A counter balance weight guide 35 is attached to the front cross bar 27 and rear cross bar 33 by means of front and rear adjustment blocks 38 and 39, respectively. A counterbalance weight 34 is positioned on the counterbalance weight guide 35 by counter balance weight adjustment knob 37 attached to the adjustment screw 36, which turns freely in the front and rear adjustment blocks 38 and 39. Spring clamp lock bars 41 are attached to end plates 40 by means of spring clamp lock bar bolts 42. Dash pots 44 are located on the plate spout support 4 and on the lever arms 28. The body of these dash pots is mounted on suitable supports (not shown). These dash pots serve to damp out any vibration in the spout, lever arms, and other parts of the weighing mechanism thus preventing the Micro Switch from being actuated prematurely before the proper weight of material has entered the valve bag.

In making a weighing the counter balance weight 34 is preset so that a predetermined weight of material may be delivered to the bag. At the beginning of the weighing cycle when there is no weight in the bag (preferably a valve bag) the two flex plates 6 are bent slightly upward by the counter balance weight 34 reacting through the three double lever arms 28, 20, and 13. The three lever arm torsion springs 30, 22, and 15 are also set at no weight so that they have pretwist that opposes the counter weight reaction. This pretwist is set and held in the torsion springs by locking the torsion spring end clamps 31, 23, and 14 in the proper position by means of the torsion spring clamp lock bars 41. As the valve bag comes to weight, it takes the slight upward bend out of the flex plates 6 and the pretwist out of the three lever arm torsion springs 15, 22, and 30. In the particular apparatus shown in FIGURE 1 and FIGURE 2 an approximately 20 to 1 magnification of spout movement is gained through the three lever arms. Thus a very small filling spout movement will cause a relatively large movement in the rear cross bar 33 that actuates the Micro or magnetic switch.

Having described the preferred embodiment of my invention, numerous variations readily fall within the scope of my invention. For example, I have shown a series of three lever arms and three torsion springs in the motion multiplying means. Such an apparatus, as constructed, has a magnification factor of 20. It is readily apparent that changing the number of lever arms and torsion springs will afford a change in the magnification factor. Also, I have shown the lever arms to comprise two essentially parallel arms. Obviously, more than two arms could be used with no apparent advantage. The actuating means may be a Micro Switch, magnet switch, or other normally available means for performing this function. This actuating means controls a valve which shuts off the flow of material from the hopper or source of material.

The sensitivity and accuracy of this weighing mechanism depend on this magnification of motion and upon the constant repetition of the reaction of the flex plates and the torsion bars. Accordingly, the flex plates and torsion springs should be made of high grade spring steel so that they will maintain their elasticity and constant reaction.

The weighing mechanism of our invention offers at least three important advantages. They are:

(1) It is relatively unaffected by dust, since pivot points are not used.
(2) Because of the high magnification factor of the motion multiplying means, only a small movement of the spout causes a relatively large movement of the cross bar that contacts the actuating mechanism.
(3) The spout is always in a relatively horizontal plane when moving downward due to the small movement and to the parallelogram arrangement of the frame support, plate support and flex plates. Because of this, the same center of gravity exists for the product and bag being filled regardless of where the bag may be placed on the spout.

It is thus apparent that I have provided a weighing mechanism, for use in bag-filling machines, that is simple, accurate, and reliable under all operating conditions including the presence of dust.

Where particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. A weighing mechanism for a bag-filling machine comprising: a frame structure; a vertically disposed back plate support connected to said frame structure, a pair of end plates attached to said back plate support; a vertically disposed front plate support having a spout connected thereto, said spout adapted to communicate with a source of material and to pass said material transversely therethrough, a pair of vertically-spaced flex plates connected between said front and back plate supports; an actuating means adapted to effect the interruption of the flow of material passing through said spout; and a motion multiplying means operating between said front plate support and said actuating means, whereby a slight downward movement of the spout effects a cutoff of material flowing into the bag upon reaching a predetermined weight, said motion multiplying means comprising a plurality of pairs of horizontally disposed interconnected lever arms, each of said pairs having front and rear cross bars and a perpendicularly disposed torsion spring secured to the lever arms intermediate to said front and rear cross bars, the ends of said torsion springs being attached to said end plates, the front cross bar of the first pair of lever arms being connected to said front plate support, the last pair of said lever arms being attached to a counter balance weight by means of a counter balance weight guide attached to the front and rear cross bars thereof; said last pair of lever arms being in operating relationship to said actuating means.

2. An automatic weighing mechanism for a valve bag-filling machine comprising: a frame structure; a vertically disposed back plate support connected to said frame structure, a pair of end plates attached to said back plate support; a vertically disposed front plate support having a spout connected thereto, said spout adapted to communicate with a source of material and to pass said material transversely therethrough; a pair of vertically-spaced flex plates connected between said front and back plate supports, thereby forming a parallelogram and maintaining relative vertical and horizontal planes regardless of the movement of the spout; a motion multiplying means; an actuating means adapted for effecting a cutoff of material flowing into the bag upon reaching a predetermined weight, said motion multiplying means comprising three pairs of horizontally disposed interconnected lever arms having front and rear cross bars, and a perpendicularly disposed torsion spring secured to each of said pairs of lever arms intermediate to said front and rear cross bars, said torsion springs being attached at the ends thereof to said end plates, the first of said pair of lever arms being located intermediate the second and third pair, the front cross bar of said first pair being connected to said front plate support; and a counter balance weight attached to the third pair of lever arms, said third pair of lever arms being in operating relationship to said actuating means.

3. A weighing mechanism for a package-filling machine comprising: a unitary support means; a spout means adapted to connect with a source of material and to pass said material transversely therethrough; a spout support means; at least two flexible metal plates each of substantially identical length parallelly disposed in spaced relationship attaching said unitary support means and said spout support means, with the points of attachment of said flexible metal plates to said unitary support means lying substantially in the same plane; an actuating means adapted to effect the interruption of flow of material passing through said spout; and a motion multiplying torque means rigidly attached to said unitary support means and communicating with said spout support means and said actuating means.

4. The mechanism according to claim 3 having only two of said flexible metal plates.

5. A weighing mechanism for a package-filling machine comprising: a unitary support means; an elongated spout adapted to connect with a source of material and to pass said material transversely therethrough; a spout support means; two flexible metal plates each of substantially identical length, said metal plates parallelly disposed in spaced relationship and in substantial axial alignment attaching said unitary support means and said spout support means; an actuating means adapted to effect the interruption of the flow of material passing through said spout; and a motion multiplying means communicating with said spout support means and said actuating means, said motion multiplying means comprising a lever pivotally affixed at an intermediate point thereof to a torsion spring which is rigidly attached to said unitary support means.

6. A weighing mechanism for a package-filling machine comprising: a support assembly including a back plate member having perpendicularly projecting first and second side plate members rigidly attached thereto; a spout means adapted to connect with a source of material and to pass said material transversely therethrough; a spout support plate; two flexible metal plates each of substantially identical length parallelly disposed in spaced relationship attaching said back plate member and said spout support plate; an actuating means adapted to effect the interruption of the flow of material passing through said spout; a motion multiplying means communicating with said spout support means and said actuating means, said motion multiplying means comprising a plurality of interconnected levers, each of said levers being pivotally affixed at an intermediate point thereof to a torsion spring having its ends rigidly attached to said side plate members.

7. The mechanism of claim 6 wherein said levers comprise rectangular frame members parallelly disposed in spaced relationship.

8. The mechanism of claim 6 wherein said levers comprise three rectangular frame members parallelly disposed in spaced relationship.

9. The mechanism of claim 6 wherein the lever directly communicating with said actuating means is provided with counter-balance means.

10. The mechanism of claim 7 wherein the lever frame member directly communicating with said actuating means is provided with an adjustably positioned counter-balance weight.

11. The mechanism of claim 8 wherein the lever frame member directly communicating with said actuating means is provided with an adjustably positioned counter-balance weight.

References Cited in the file of this patent

UNITED STATES PATENTS

| | | |
|---|---|---|
| 299,758 | Brul | June 3, 1884 |
| 2,033,318 | Abramson | Mar. 10, 1936 |
| 2,681,222 | Stelzer | June 15, 1954 |
| 2,699,932 | Knobel | Jan. 18, 1955 |
| 2,716,546 | Stelzer | Aug. 30, 1955 |
| 2,846,177 | Knobel | Aug. 5, 1958 |
| 2,883,140 | Stafford | Apr. 21, 1959 |
| 2,936,994 | Lau | May 17, 1960 |